Figure 1:

Jan. 2, 1951         E. GABRIELLI         2,536,879

SYSTEM OF GETTER PROTECTION IN HIGH-VACUUM TUBES

Filed Feb. 28, 1948

INVENTOR

ERNESTO GABBRIELLI

By
ATTORNEY

Patented Jan. 2, 1951

2,536,879

UNITED STATES PATENT OFFICE 2,536,879

SYSTEM OF GETTER PROTECTION IN HIGH VACUUM TUBES

Ernesto Gabrielli, Milano, Italy

Application February 28, 1948, Serial No. 12,127
In Italy February 15, 1943

Section 1, Public Law 690, August 8, 1946
Patent expires February 15, 1963

6 Claims. (Cl. 250—27.5)

Together with the vacuum tube industry and the manufacture of thermionic valves particularly, a special industry has been developed for the preparation of various kinds of chemical getters for residual gas, indispensable for obtaining those high vacua required in the technique of the manufacturing mentioned above.

As a basis for chemical getters there is the element barium, which together with other metals such as strontium, magnesium and sodium, all having more or less the property of combining with various kinds of gas to produce solid compounds having a vapor pressure practically zero, gives rise to the manifold kinds of getters now used in the industry.

Barium is a metal with the maximum affinity for all gases and vapors, excluding rare gases, which may be present in a vacuum tube after the most thorough mechanical and physical evacuation, with a part of which it may combine at room temperature, whereas the rest combines with this metal in the vapor state as it passes from its support to the glass wall of the tube where it condenses.

All getters generally must have the property of remaining inalterable during the various manipulations required to assemble a valve, i. e., they must withstand air exposure during all the time before evacuation of the tubes where they are assembled. With this aim in view some types of getters have been created consisting of various stable combinations of Ba-Mg, Ba-Mg-Sr, or barium with other metals, such as aluminum or nickel, from which by fractioned distillation the barium and the other secondary getters evaporate at determined temperatures to carry out their specific function. Such getters are obtainable in the form of tablets, or in any other way, and are assembled on heaters provided for this purpose, of suitable sizes and shapes, in the tubes to be evacuated.

To prepare pure barium getters, and owing to the rapid alteration of this metal on exposure to the air, copper, nickel and iron tubes filled with barium were made and flattened at the ends, so that the tubes can protect the barium contained therein from contact with the outside air during manipulations of assembly before the tubes are evacuated. The degree of protection obtained with this system, due to the fact that the two flattened ends of the tube enclosing the barium cannot and must not close in perfectly, has always remained partial, with the consequent more or less deep alteration of the layers of barium facing the two flattened sections. This alteration produces an equivalent quantity of barium salts, that remain in the flattenings, with the consequent freeing of gas due to the decomposition of the said salts in the tube to be evacuated during heating of the heating support and reduction of the yield of the getter.

Owing to this fact it is difficult to keep this type of getter during storage, and the usage was therefore turned to, to supply tubes containing barium in skeins to be cut when assembly takes place, thus adding to the cost of labor.

Another disadvantage, resulting from the other extreme of excessive flattening of the ends of the tubes, resides in the amount of resistance which opposes the escape of barium vapor at the evaporation temperature of this material in the vacuum, with the consequent violent and total departure of the getter at a more elevated temperature at which the flattenings open, this behavior being very often detrimental to good evacuation of the valve, particularly where it is required to be able to control at will the liberation of the barium as a function of temperature.

The system of protection according to the present invention does away with all the troubles mentioned hereinbefore, and furthermore offers the following ulterior advantages: Preparation of the getter may take place direct on the heating support, with elimination of labor required for assembly of the point of use.

During heating the getter always acquires the temperature of the heating support, so that evaporation of the getter metal always occurs when the support has reached a certain temperature, with an evident advantage in the evacuation of the valves by automatic machines in comparison with Ba getters in tubes, or those in an alloy in the form of tablets, in which, when resting merely against the support, and often in bad contact with the latter, they require superheating of the support to bring the getting material to its normal temperature of evaporation.

The new type of getter protection, which is the subject-matter of this invention, closes the metal or active alloys in a hollow or cavity made direct on the heating support, that may be of any suitable substance or shape, in which it remains sealed at the top by a metal cover fusible at a lower temperature than that of evaporation of the active substance. With melting of this cover in the vacuum the hollow remains open which contains the getter for free evaporation of same, with a possibility of fractioning this liberation by controlling the temperature of the support.

Fig. 1 shows in a section, an ordinary protection tube.

Figure 2:
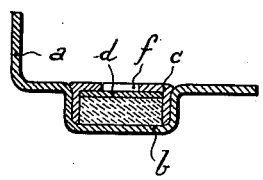
Figure 3:
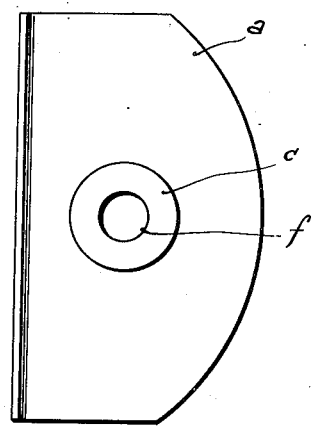

Fig. 2 illustrates an embodiment of cross type of getter according to this invention comprising a heating support $a$ for the getter and having the cavity $b$ containing the barium; the closing cap $c$ of a metal with a higher melting point than that of evaporation of the barium, or of the getter generally, has a hole $f$, that remains closed by a very light disk $d$ of fusible metal such as Al, Mg, etc. When melting of the disk takes place, hole $f$ stays open for free exhaust of the getter metal at its evaporation temperature in the vacuum. With this system any substance having getter properties and which it is difficult to preserve, or even the alloys of Ba-Mg, Ba-Mg-Al, or other more or less stable alloys, can be closed in the hollow on the heater, if perfect protection from outside elements should be required.

The procedure of insertion barium, strontium or another getter into the hollow of the heater prior to the application of the seal required for the protection of the getter material, can take place with the use of special automatic machines operating under vacuum, or under the protection of an inert gas with the getter at the working temperature, or else with the use of a particular machine in which the cycle of operation is carried out fully without contact between the getter and air.

This has already been realized by exploiting the malleability of barium in a process which comprises filling of a hopper chamber and transferring the filling from said chamber to the cavity in a machine provided with a movable chamber and mechanism for displacing the same so that once the predetermined volume of barium is delivered by the hopper all following operations up to and including introduction into the hollow on the heater, always take place with a constant chamber of volume entirely filled with the barium.

What I claim is:

1. An article for protecting a getter material during introduction thereof into an evacuated envelope, comprising a heating support provided at the top with a recess for receiving the getter material, a cover for said recess, said cover comprising a downwardly opening capsule made of a metal not meltable at the evaporation temperature in vacuo of said getter material, said capsule fitting closely into said recess and being provided with a central hole in the top wall thereof, and a fusible sealing plate fitting inside said capsule to underlie said hole, said plate consisting of a metal having a melting point lower than said evaporation temperature.

2. An arrangement according to claim 1 wherein said plate consists of aluminum.

3. An arrangement according to claim 1 wherein said plate consists of magnesium.

4. A getter material protector comprising a heating support having a recess formed therein for receiving the getter material, a cover for said recess tightly engaging therein and formed of a metal having a melting point substantially higher than the evaporation temperature of said getter material in vacuo, said cover having an opening formed therein, and a fusible sealing plate underlying said opening and formed of a metal having a melting point lower than said evaporation temperature.

5. A protector for a pure barium getter comprising a heating support having a recess formed therein for receiving the barium getter, a cover for said recess adapted to seal the barium getter therein at room temperatures, and a portion of said cover being formed of a metal having a melting point lower than the evaporation temperature of the barium getter in vacuo.

6. The combination of a pure barium getter and a protector therefor, said protector comprising a heating support having a recess formed therein within which said getter is disposed, a closure for said recess sealingly engaging said recess and formed of a metal having a melting point substantially higher than the evaporation temperature of said barium getter in vacuo, an aperture formed in said closure, and a fusible sealing plate underlying said aperture for sealing the latter at normal room temperatures and having a melting point lower than said evaporation temperature of said getter whereby said aperture will be unobstructed to permit free evaporation of said getter when said support is heated to the requisite temperature.

ERNESTO GABRIELLI.

REFERENCES CITED

The following references are of record in the file of this patent:

UNITED STATES PATENTS

| Number | Name | Date |
|---|---|---|
| 1,921,067 | Bedford | Aug. 8, 1933 |
| 1,922,162 | King | Aug. 15, 1933 |
| 1,979,506 | Umbreit | Nov. 6, 1934 |
| 2,000,234 | Klett | May 7, 1935 |
| 2,093,273 | Haslauer | Sept. 14, 1937 |
| 2,100,746 | Miller et al. | Nov. 30, 1937 |
| 2,183,841 | King | Dec. 19, 1939 |
| 2,242,100 | Atlee | May 13, 1941 |
| 2,445,993 | Beggs | July 27, 1948 |

FOREIGN PATENTS

| Number | Country | Date |
|---|---|---|
| 707,127 | Germany | June 13, 1941 |

OTHER REFERENCES

Batalum: A Barium Getter for Metal Tubes, by E. A. Lederer and D. H. Wamsley, R. C. A. Publication No. ST-81, (Reprint from R. C. A. Review, July 1937, pp. 117 through 123).